Sept. 19, 1933.  T. L. HARRISON  1,927,785
AUTOMOBILE AUTOMATIC BACKSTOP
Filed March 4, 1932
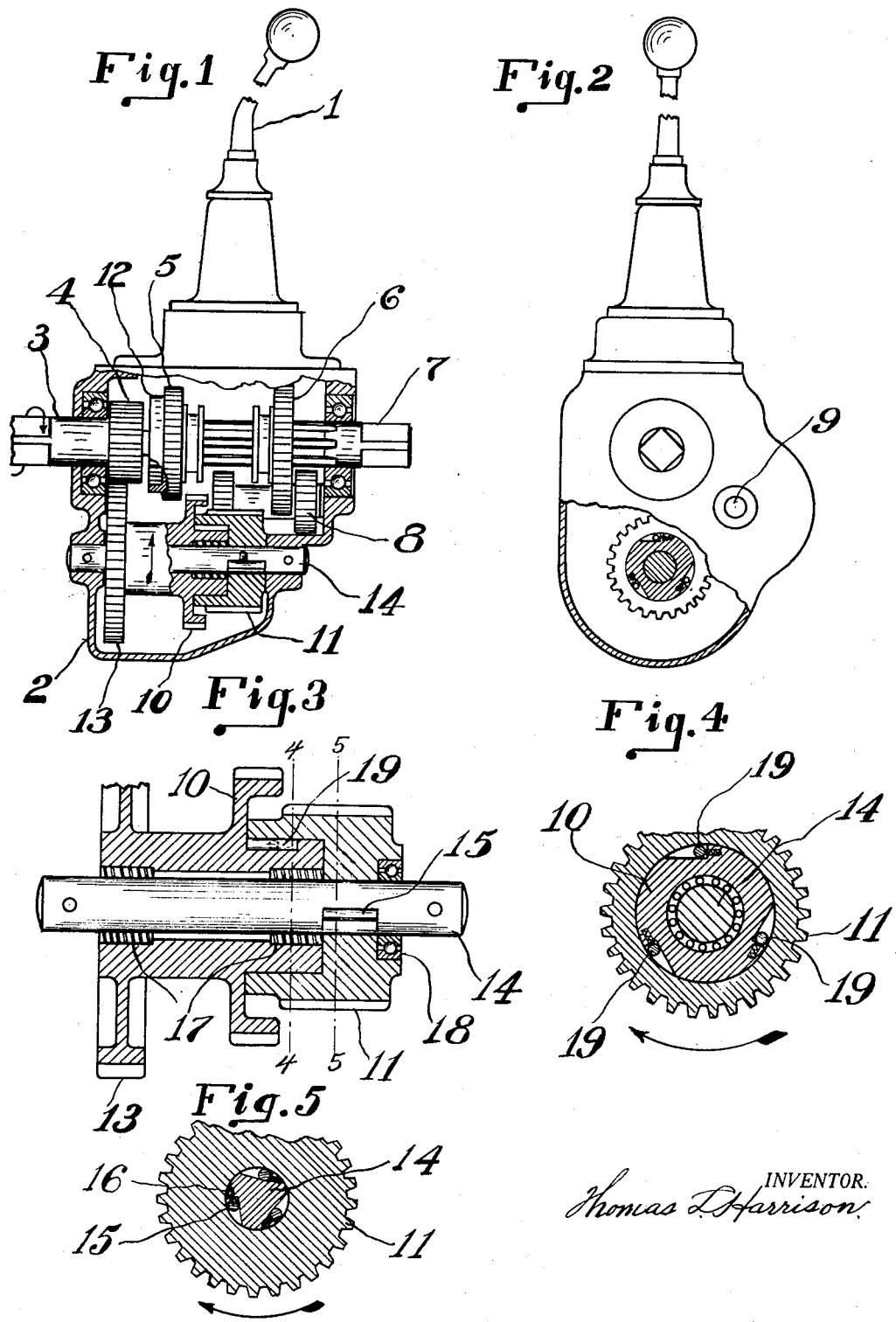
INVENTOR.
Thomas L. Harrison Patented Sept. 19, 1933

1,927,785

UNITED STATES PATENT OFFICE 1,927,785

AUTOMOBILE AUTOMATIC BACKSTOP

Thomas Lloyd Harrison, Philadelphia, Pa., assignor of one-half to Frank Ramsey Flounders, Elkins Park, Pa.

Application March 4, 1932. Serial No. 596,826

1 Claim. (Cl. 192—4)

My invention relates to clutches installed in an automobile transmission case to automatically prevent the automobile from rolling backwards and to permit a start from rest when stopped on a hill or inclined plane.

One of the objects of my invention is to provide a clutch which is capable of more rapid operation than clutches or brakes of similar character heretofore constructed, as far as I am aware, so that a greater safety may be obtained than previously has been available.

A further object of the invention is to simplify the construction of the clutch to hereby enable its manufacture at a substantial reduction in cost and applicable to automobiles now in use or hereafter to be manufactured.

This application is a continuation in part and an amplification of my prior application, Serial No. 340,228, dated February 15th, 1929.

To these and other ends, the invention comprehends the construction as hereinafter described and illustrated in the drawing in which I have illustrated one form of construction embodying said invention. It will be understood, however, that changes in the details of construction may be made within the scope of the claim without departing from the invention.

In the drawing:

Fig. 1 is a side elevation and part sectional view of a transmission gear set and casing.

Fig. 2 is a rear elevation and part sectional view of the clutch looking toward the left in Fig. 1.

Fig. 3 shows an enlarged view of the countershaft gears in section mounted on a stationary shaft with grooves and rollers to prevent a countershaft gear from reversing its direction of rotation on the countershaft embodying my invention.

Fig. 4 is an enlarged section on line 4—4 looking toward the left in Fig. 3, indicating the direction of rotation of the countershaft gears and embodying part of my invention.

Fig. 5 is an enlarged section on line 5—5 looking toward the left in Fig. 3 embodying part of my invention.

Referring to the drawing: 1 designates the gear shift lever. 2 the transmission casing. 3 the main drive or clutch shaft operating only in a counter clockwise direction viewed from the rear. 4 designates the main drive shaft constant drive pinion which is integral with shaft 3. 5 designates the high and second speed sliding gears mounted on shaft 7 and operated by gear shift lever 1. 6 is the low speed and reverse sliding gear, which is also operated by gear shift lever 1. 7 is the main driven shaft. 8 indicates a reverse idler gear set mounted on a fixed shaft 9 which rotates shaft 7 in a clockwise direction viewed from the rear when engaged with shift gear 6. 11 is a low speed or starting gear mounted on the hub of gear 10 and which when engaged with sliding gear 6 operates the main driven shaft 7 in a counter clockwise direction viewed from the rear. 10 designates the second speed counter shaft gear mounted on shaft 14, and which when engaged with shift gear 5 operates main driven shaft 7 in a counter clockwise direction. 12 is an internal gear clutch integral with sliding gear 5 and which when engaged with constant drive pinion 4, operates shaft 7, counter clockwise viewed from the rear at the same speed as that of main drive shaft 3. 13 is a countershaft gear operated through gear 4. 14 is a stationary shaft securely fastened in transmission casing 2 by dowel pins or other means. Fig. 4 shows a sectional view on line A.A. through shaft 14, roller bearing 17, gear hub 10, rollers 19 and gear 11, looking to the left in Fig. 3, showing angular grooves in the gear hub 10 in which rollers 19 are located.

Roller pins 19 are located in the angular grooved slots of gear hub 10 for driving countershaft gear 11 in a clockwise direction and are provided to prevent locking gear 10 to gear 11 and so to shaft 14 when shift gear 5 is engaged with gear 10 or when gear 12 is engaged with gear 4 (i. e. when second or high gear is engaged) when the automobile tends to roll backward on an incline plane thereby allowing gears 10 and 5 to be disengaged.

In Fig. 5 rollers 15 are located in the angular grooved slots of shaft 14 for locking the countershaft gear 11 only when said gear 11 tends to rotate in a counter clockwise direction viewed from the rear thereby preventing an automobile from rolling backward after coming to a stop on an incline plane while shift gear 6 is engaged with gear 11.

Springs 16 which are located in separate recesses drilled in the bottom of the angular grooves of shaft 14 tend to press rollers 15 outwardly causing rollers 15 to act positively against the internal surface of an intermediate gear 11 as shown in Fig. 5 locking same when the intermediate gear 11 tends to rotate in a counter clockwise direction viewed from the rear. 17 are roller bearings mounted in countershaft gear hubs 10 and 13 and revolve on countershaft 14.

In Fig. 1, gear 4, rotated by the engine, constantly rotates gear 13 and integral gear 10, always in the same direction. Gear 11 is rotated by means of the one-way clutch acting between the overlapped hubs of gears 10 and 11, always in the same direction.

To start the automobile forward, gear 6 is adapted to be meshed with gear 11 by means of the gear shift lever so that gear 11 can drive gear 6, its splined supporting shaft and driveshaft 7, driving the automobile forward through the usual mechanism. Initial motion of the automobile in a backward direction will automatically cause the one-way clutch to act between the hub of gear 11 and fixed countershaft 14, prevent rotation of gear 11 in the reverse direction, and so stop backward motion of the automobile.

To drive the automobile backward, gear 6 is adapted to be moved by the gear shift lever into mesh with reverse idler gear 8, so that gear 6 is driven in a reverse direction of rotation by gear 11. In this combination forward movement of the automobile would reverse the normal direction of rotation of gear 11, but is prevented by the one-way clutch operating between the hub of gear 11 and fixed countershaft 14.

Integral gears 5 and 12 are adapted to be meshed with gears 10 and 4 respectively by movement of the gear shift lever in order to secure the so-called "second" and "high" gear forward propulsion of the automobile. If stopped while moving up a grade in either "second" or "high" gear, initial backward motion of the automobile would reverse the normal direction of rotation of countershaft gears 13 and 10, the one-way clutch between the hubs of gears 10 and 11 permitting gears 13 and 10 to rotate in reverse direction independently of gear 11. Without this one-way clutch gears 13 and 10 would be locked through gear 11 to counter shaft 14, and the resulting pressure on the teeth of gear 5 or 12, with the gears in "second" or "high" respectively, would cause it to be impossible to release gear 5 or 12 by the gear shift lever. In this event, without the one-way clutch between the overlapped hubs of gears 10 and 11, backward motion of the vehicle would be impossible, and forward motion could only be accomplished where the engine had sufficient power to bring the automobile into motion through the gear ratio in which the automobile had been stopped.

Having thus described my invention what I claim and desire to secure by Letters Patent is:

In an automobile transmission in combination, independent gears having overlapped hubs, rotatably mounted on a stationary countershaft; automatic means for effecting rotation by the next adjacent gear of one of said gears in only one direction; and means for limiting the direction of rotation of said gear relative to said countershaft.

THOMAS LLOYD HARRISON.